United States Patent [19]

Grunberger

[11] 4,151,582
[45] Apr. 24, 1979

[54] POINT ARRAY SHEET LIGHTING APPARATUS

[75] Inventor: Lawrence W. Grunberger, Peekskill, N.Y.

[73] Assignee: Izon Corporation, Stamford, Conn.

[21] Appl. No.: 889,736

[22] Filed: Mar. 24, 1978

Related U.S. Application Data

[63] Continuation of Ser. No. 536,409, Dec. 26, 1974, abandoned.

[51] Int. Cl.$^2$ .............................................. F21V 7/04
[52] U.S. Cl. ........................................ 362/31; 362/32; 362/297; 40/546; 350/96.10
[58] Field of Search ................... 362/31, 32, 297, 300; 350/96 R, 96 B, 286; 250/227; 340/380; 40/130 K; 116/DIG. 5, DIG. 26; 428/137

[56] References Cited

U.S. PATENT DOCUMENTS

| | | | |
|---|---|---|---|
| 1,800,452 | 4/1931 | Karnasch | 350/286 |
| 2,507,035 | 5/1950 | Maynard | 362/31 |
| 2,563,191 | 8/1951 | Russ | 350/96 R |
| 2,775,687 | 12/1956 | Cushman | 362/27 |
| 3,062,441 | 11/1962 | Martin | 350/96 R |
| 3,444,385 | 5/1969 | Paglee | 350/96 R |
| 3,535,537 | 10/1970 | Powell | 350/96 B |
| 3,576,430 | 4/1971 | Fickenscher | 350/96 B |
| 3,692,383 | 9/1972 | Herod et al. | 350/96 R |
| 4,053,206 | 10/1977 | Yevick | 362/31 X |
| 4,082,029 | 4/1978 | Rumer, Jr. et al. | 362/31 X |

OTHER PUBLICATIONS

Stanley, IBM Tech. Disc. Bull., vol. 14, #2, Jul. 1971, pp. 452–453.
Foglia, IBM Tech. Disc. Bull., vol. 4, #4, Sep. 1961, p. 45.

*Primary Examiner*—Peter A. Nelson
*Attorney, Agent, or Firm*—Thomas J. Greer, Jr.

[57] ABSTRACT

An illumination device for establishing an array of point light sources, wherein the light sources are generally closely spaced. In a first embodiment a planar substrate is provided with an array of apertures. One surface of the substrate is coated with a first coating having a first index of refraction, the coating extending into the sides of the apertures. A second coating having a second and higher index of refraction is applied on top of the first coating and is coextensive therewith. Light fed into the edges of the second coating passes by internal reflection to the apertures where it exits, parallel with the aperture axes. In a second embodiment, the array of point sources is defined by beam-compressor lenses supported on a rigid, planar substrate. Each column of lenses is positioned adjacent an edge of an internally reflecting sheet, there being as many sheets as columns. An opposite edge of each sheet receives light, to thereby illuminate the input ends of the beam-compressor lenses. In a third embodiment, reflecting faces are formed integrally with a planar sheet of a transparent substance. Light fed edgewise into the sheet is reflected upwardly by the arrayed faces.

12 Claims, 14 Drawing Figures

LIGHT IN

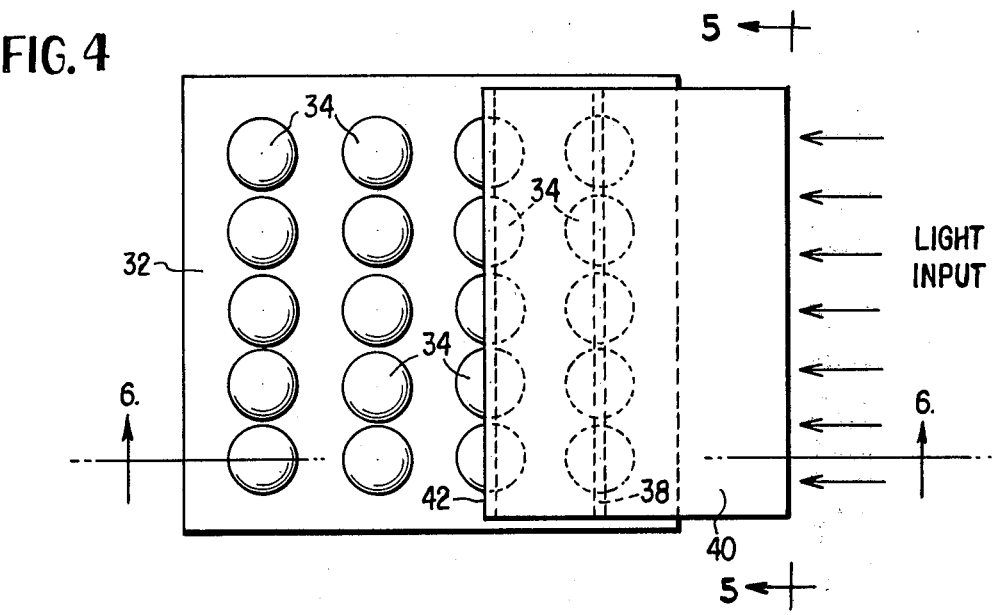
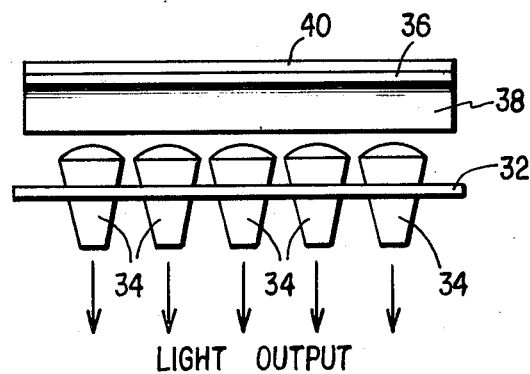
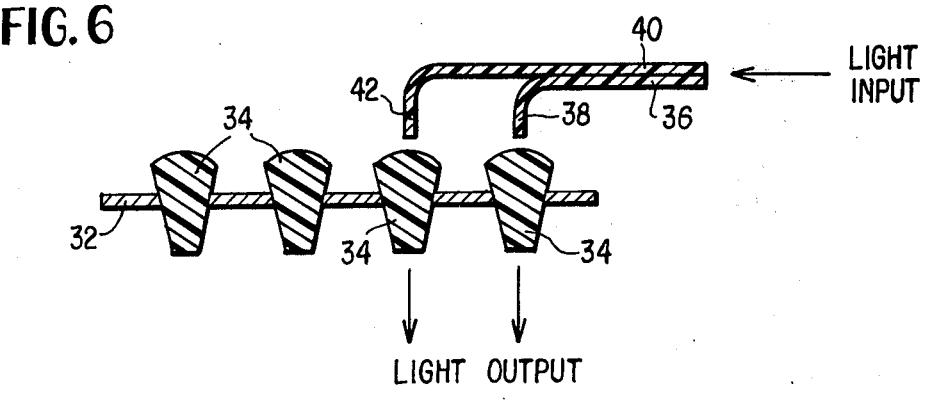

POINT ARRAY SHEET LIGHTING APPARATUS

This is a continuation of application Ser. No. 536,409 filed Dec. 26, 1974, now abandoned.

This invention relates to illuminating devices for establishing an array of relatively small light sources. In allowed, co-pending application Ser. No. 309,968, now U.S. Pat. No. 3,864,034 by George J. Yevick, filed Nov. 28, 1972, for "Microfiche and Reader", hereby incorporated by reference, a microfiche having integral lenses, termed lensettes because of their small sizes, is disclosed. The term lensfiche has been there applied to a microfiche having integral lensettes on one surface and having a photographic emulsion on the other surface. For the purpose of illuminating and thereby projecting to a screen microimages on the emulsion, a plurality of optical fibers is employed. Each fiber is positioned so that projection light exiting from one end is directed against a corresponding micro-image, normal to the photographic emulsion. Typically, the exit or output ends of such optical fibers are placed at the corners of squares 100 mils on a side. The great number of such optical fibers is required to illuminate the micro-images. The light-output fiber ends define a plurality of points of light, the term—points—being employed because of their relatively small size.

While the use of optical fibers to illuminate micro-images produces the desired macro scene on the viewing screen, the precision of alignment of the optical fiber ends is somewhat difficult. In order to facilitate the fabrication of such micro optical apparatus of the type shown in the noted co-pending application, other means of producing an array of point sources of light for illumination are desirable.

According to the practice of this invention, transparent sheets or layers are employed in lieu of optical fibers.

According to a first embodiment of the invention, a plastic sheet is provided with a plurality of apertures which form an array. One surface of the sheet and the sides of the apertures are coated with a transparent substance having a first index of refraction. Next, a second coating, coextensive with the first, is applied, with the second coating having a second and higher index of refraction. Light fed into the edges of the second coating is totally internally reflected and finds its way into the volume or zone of the apertures and thence exits from the apertures, substantially parallel with the axes of the apertures. The exiting light thus defines an array of point sources of light.

According to a second embodiment of the invention, a transparent plate having a first index of refraction is coated on both sides with a substance having a second and lower index of refraction. At desired points of the sheet, the sheet is deformed, with each deformation defining a reflecting surface at a 45° angle with respect to the plane of the sheet. Light fed edgewise into the sheet is reflected from the deformed portions, outwardly and normal to the sheet.

According to a third embodiment of the invention, an array of beam-compressor lenses is mounted in a holder, with the holder being substantially planar and the optic axes of the beam-compressor lenses being normal thereto. Edges of bent and superposed light sheets are positioned contiguous to the input ends of the beam-compressor lenses, with the edges being spaced from each other so as to coincide with rows defined by the axes of the beam-compressor lenses. Light is then fed into an input edge of each curved sheet. Light exiting from the edges of the sheet thus passes into the input ends of the beam-compressor lenses for illumination of micro images of a lensfiche.

IN THE DRAWINGS:

FIG. 4 is a partially schematic plan view according to another embodiment.

FIG. 5 is a view taken along section 5—5 of FIG. 4.

FIG. 6 is a view taken along section 6—6 of FIG. 4.

Figure 1:
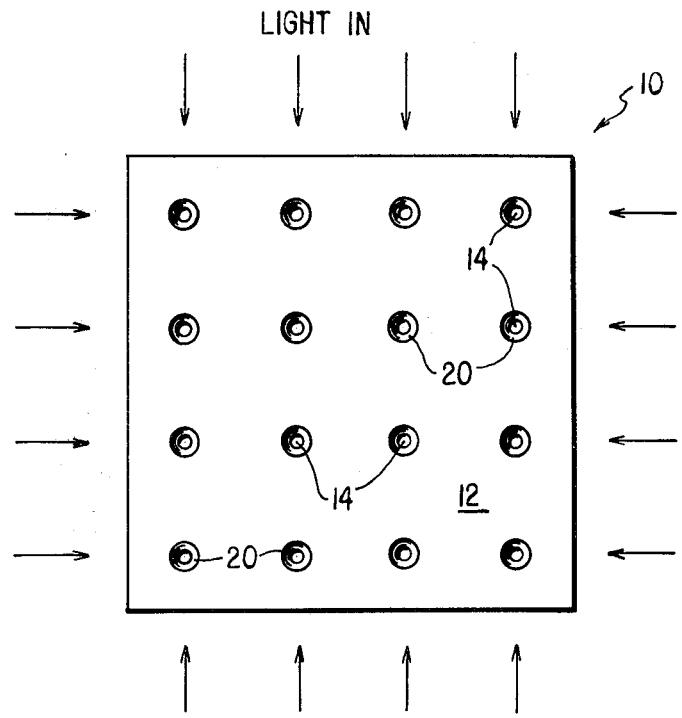
FIG. 1 is a partially schematic view illustrating a generally rectangular bstrate provided with a plurality of apertures, with the apertures defining an array of point sources of light.
Figure 2:
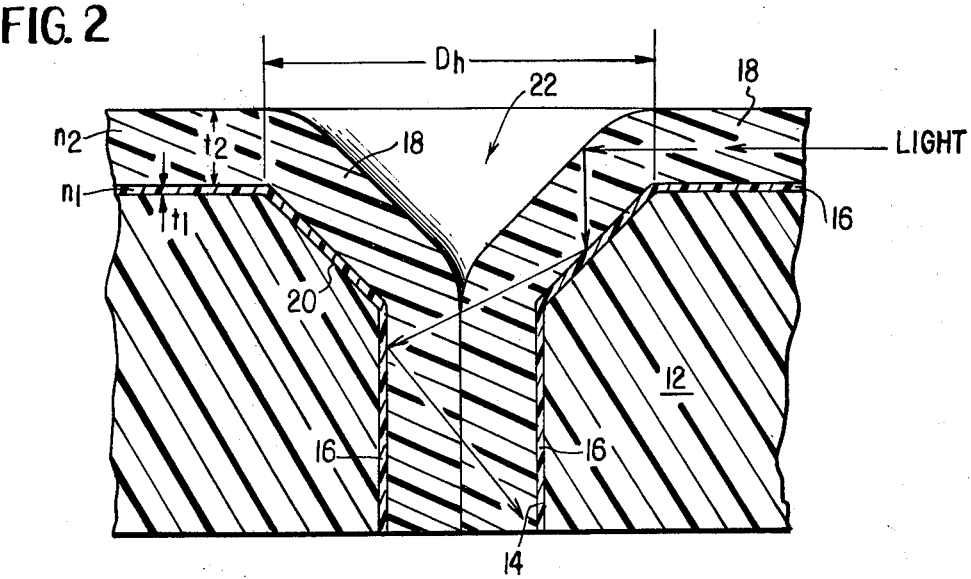
FIG. 2 is a transverse view of the substrate of FIG. 1 and illustrates a typical coating configuration associated with a typical aperture.

Referring now to FIG. 1 of the drawings, the numeral 10 denotes generally a substrate which may be of rectangular form and of a rigid material. The sheet or substrate is designated by the numeral 12 and includes a plurality of apertures 14 extending completely therethrough, with the apertures forming a generally regular array. Typically, the array is rectangular. As shown at FIG. 2 of the drawings, the substrate 12 is coated on one surface with a coating 16 of a transparent material having a first index of refraction. The coating 16 extends completely over the surface of the substrate 12, extending down into the interior of apertures 14, coating the sides of the interior as illustrated. Next, a second transparent coating designated by the numeral 18 is applied on top of the first coating. The second coating 18 is substantially coextensive with the first and hence also extends down into the apertures 14. If desired, a chamfer 20 may be provided at the upper entrance to each aperture 14. The coatings 16 and 18 are substantially parallel and, in the case of the chamfer 20 at the entrance to each of the apertures, a depression 22 is thereby defined at the top of each aperture, and of a diameter $D_h$.

Preferably, the surface finish on the sides of apertures 14, the surface of chamfered portions 20, and the top surface of substrate 12 has a root-mean-square roughness not in excess of 0.1 micron. These surfaces should be as smooth as possible. The first coating 16 is, typically, a layer of clear polymer of relatively low refractive index $n_1$ of a thickness between 1 and 10 microns. Preferably, the exterior surface of coating 16 is smooth to within a local roughness of 100 Å. The second coating 18 is also typically of a clear polymer but of relatively higher index of refraction $n_2$. The second coating may be applied by means of the process described in U.S. Pat. Nos. 3,288,728 and 3,342,754, hereby incorporated by reference. In such an example, the first coating 16 may be of poly(methylmethacrylate) having an index of refraction $n_1$ approximating 1.491.

As indicated by the arrows, light fed into the edges of coating 18 is internally reflected and travels until it strikes one of the curved exterior portions of the coating in the region of depression 22. Again, internal reflection results in a passage of the light down into the apertures 14 and substantially parallel with their longitudinal axes.

Figure 3:
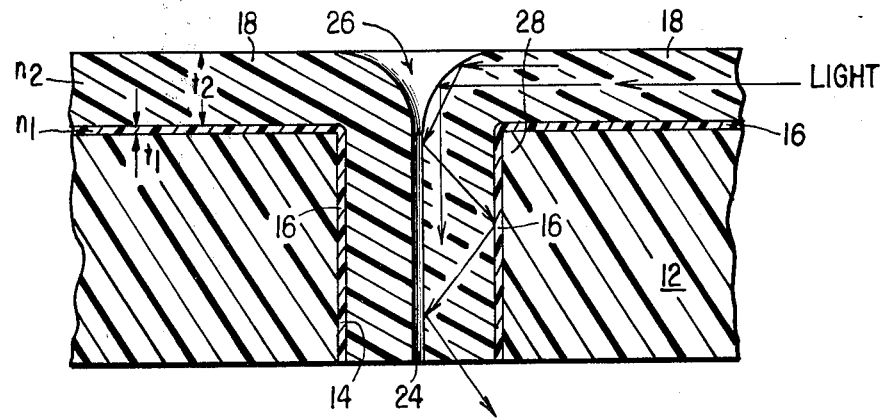
FIG. 3 is a view similar to FIG. 2 and shows an embodiment.

Referring now to FIG. 3 of the drawings, modification is illustrated wherein the second coating is of such a thickness that less than the entire volume of the openings 14, in distinction to that of FIG. 2 wherein the volume is filled, is filled by the two coatings. The result is an elongated and generally cylindrical hole 24 which is substantially coaxial with the longitudinal axis of each aperture. Again, a depression exists above each aperture and is here denoted by the numeral 26, similar to depression 22 of the embodiment of FIG. 2. Instead of the chamfered portion 20 of the embodiment of FIG. 2, the shoulder portions adjacent the interface of the one surface of substrate 12 and the apertures 14 is square and is denoted by the numeral 28.

In a typical fabrication of the invention shown at FIGS. 1–3, the diameter of the apertures 14 is 13.5 miles and they lie at the corners of squares 100 nils on a side.

Referring now to FIGS. 4, 5 and 6, another embodiment of the invention is illustrated. The numeral 32 denotes a rigid substrate having a plurality of apertures supporting and positioning a plurality of beam compressor lenses 34. Each beam compressor lens functions to gather light fed to its input end and pass it to its output end. The output end of each lens is smaller than the input end, hence the term beam compressor. In general, such a lens 34 may be formed from common materials, such as glass, by known optical techniques. Such a lens 34 may also assume the form shown in U.S. Pat. No. 3,188,478 to Binks or U.S. Pat. No. 3,187,627, issued to Kampany, or U.S. Pat. No. 3,043,910, issued to Hicks. The precise manner of fabrication or type of beam compressor lens is not material to the practice of this invention and accordingly a further description thereof will not be given.

The smaller or output ends of the beam compressor lenses are positioned adjacent the micro-images of a lensfiche for the purpose of illuminating the micro-images for projection, in lieu of the optic fiber ends shown at FIG. 5 of the noted Yevick application. The lenses 34 are arranged in an array illustrated as rectangular, but, it will of course be appreciated that any type of array or any spacing may be employed to suit a particular need.

The numeral 36 denotes one of a plurality of totally-internally-reflecting and transparent sheets. Such sheets may be formed of, for example, poly(methylmethacrylate), both surfaces of which are coated with a material having a lower index of refraction. Such a sheet after this manner of coating will exhibit the well-known properties of optical fibers; namely, the property of total internal reflection. Light fed into an edge of the sheet, substantially parallel with the plane of the sheets, will be totally internally reflected and will accordingly exit from the opposite edge of the sheet. The edges of the sheet are, in general, not coated. Sheet 36 is curved so that its edge 38 lies adjacent the input ends of a first column of beam compressor lenses. A second and similar sheet 40 is positioned so that its surface touches a surface portion of sheet 36 and also has a curved portion to produce an edge 42 adjacent a second column of beam compressor lenses. As indicated at FIGS. 5 and 6 of the drawings, the light input ends of sheets 36 and 40 touch one another and thereby define a laminate. The reader will now be in a position to comprehend that additional sheets such as 36 and 40 are stacked on top of one another and each has a curved portion which extends downward, as in the manner shown at FIG. 6, so as to be adjacent the input ends of a corresponding column of beam compressor lenses. The number of totally internally reflecting sheets is accordingly equal to the number of columns of beam compressor lenses.

The operation of the device will be apparent. Light from a suitable source is fed into the input end of the laminate defined by the stacked parts of the light-conducting sheets. The light divides and a portion travels through each sheet and exits at its corresponding edge. From the edge, most of the light enters the beam-compressor lenses for transmission therethrough and thence to micro-images of a lensfiche, or to any other objects which require this type of illumination.

It will be understood that while each light-conducting sheet may be coated on both of its surfaces with a material of lower refractive index, such a coating is not absolutely necessary, except that those points or zones where the sheet is contacted by a support. The sheets are held in place by a frame which grips them at their edges. The sheets are preferably bent to their desired configuration prior to insertion into the mounting and supporting frame. The beam-compressor lenses are chosen to be of such size and shape that each column of lenses intercepts the major portion of the light emanating from its corresponding lighting sheet edge, and thus the amount of light wasted is kept to a minimum. Preferably, each lens focuses the intercepted light to a spot which is slightly larger than the micro-images to be illuminated on the lensfiche.

Figure 7:
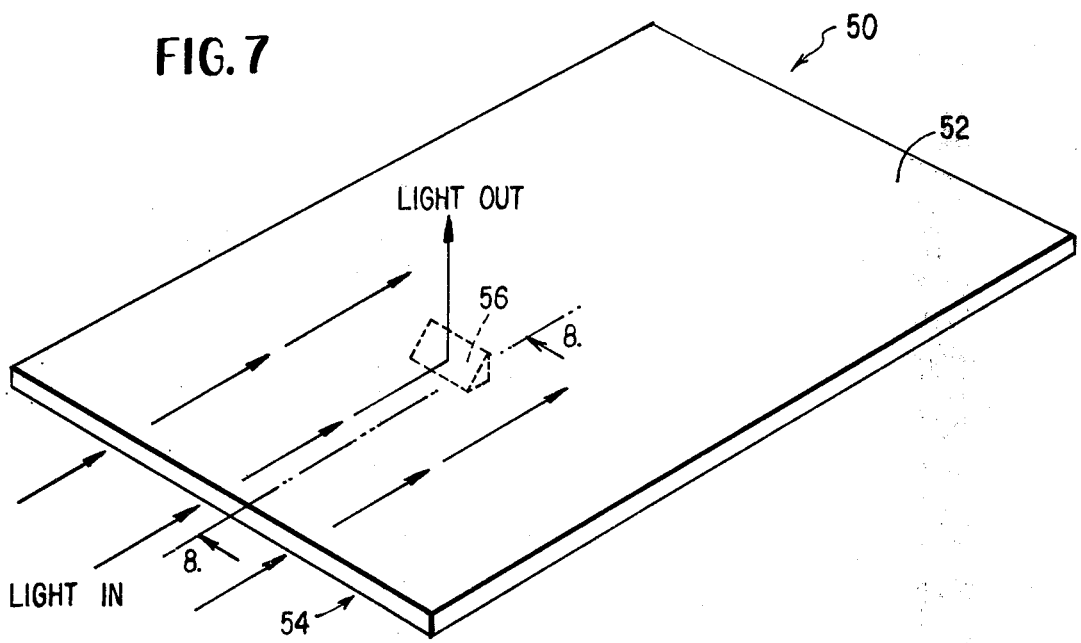
FIG. 7 is a perspective view illustrating a third embodiment of the invention.
Figure 8:
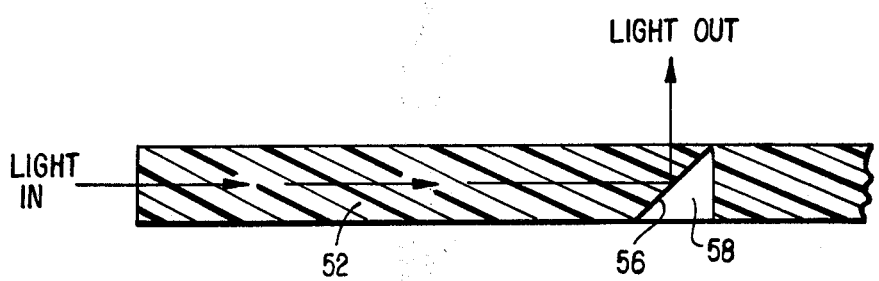
FIG. 8 is a partial cross-section of FIG. 7.
Figure 9:
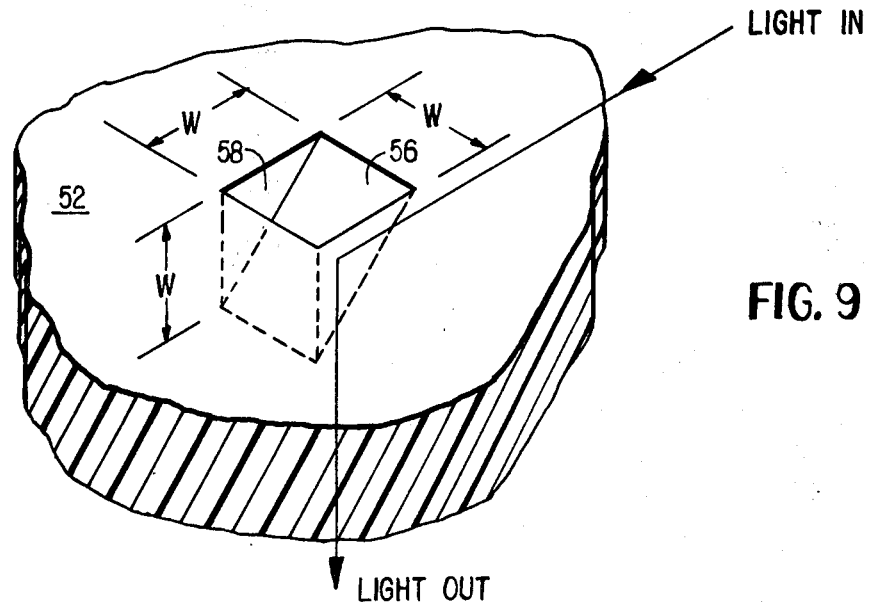
FIG. 9 is a partial perspective view of an enlarged scale of a reflecting face shown in FIG. 8.

Referring now to FIGS. 7 to 11 of the drawings, a third embodiment of the invention is illustrated. The numeral 50 at FIG. 7 denotes generally the device and includes a transparent sheet 52 formed of, for example, poly(methylmethacrylate) and coated on both sides so that it is totally internally reflecting as is the case with the well-known optic fiber having this property. The coating is of an index of refraction less than the index of the sheet 52. Light fed into one edge 54 of the sheet strikes a plurality of reflectors 56, only one of which is shown at FIG. 7. Reference now to FIG. 8 will illustrate the form of the reflector which is defined by a punched or cast portion of the transparent material 52, defining a void or cavity 58. The arrows indicate the direction of light fed onto the reflecting face 56 and the direction of the reflection light, i.e., normal to the surface of sheet 52. FIG. 9 of the drawings illustrates in greater detail a typical reflecting face 56 formed by casting or by pressing with a suitable mandrel or die into sheet 52. Again, the arrows indicate the direction of transmission of light along the sheet and between its surface until it strikes reflecting face 56 for reflection out of the sheet. The reader will now be in a position to understand that if a sheet 52 is provided with a plurality of such reflecting faces 56 and if one edge of the sheet is illuminated as indicated, then an array of point sources of light may be generated.

Figure 10:
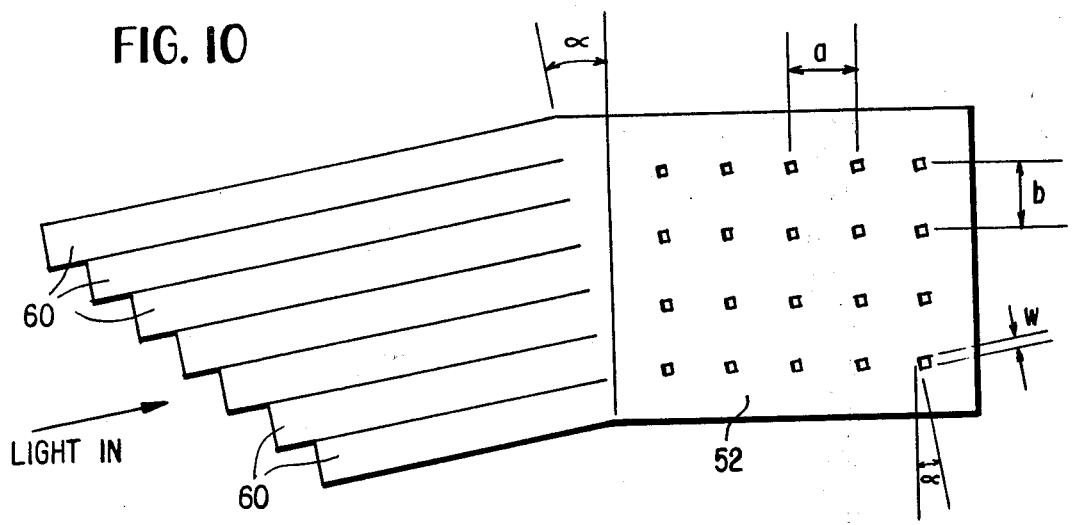
FIG. 10 is a partial schematic plan view illustrating one construction for feeding light into the embodiment shown at FIG. 7.
Figure 11:
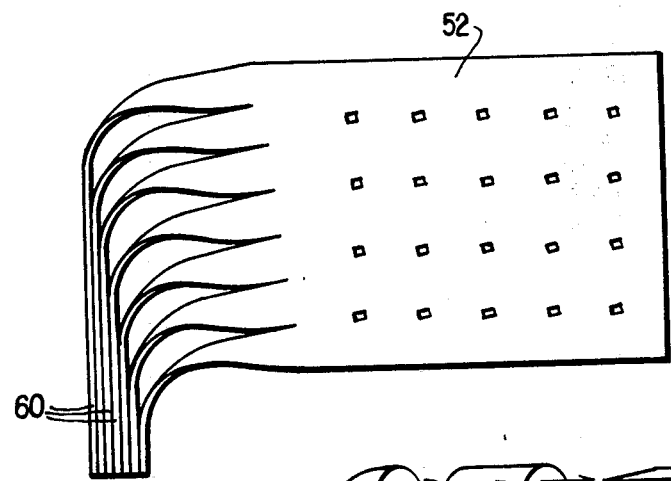
FIG. 11 is a perspective view showing the assembled construction of FIG. 10.

Reference now to FIGS. 10 and 11 illustrates one embodiment of such a sheet wherein the input edge of the sheet is provided with a plurality of integral strips 60, separated from each other except at their bases, and adapted to be twisted so that their ends meet in a lamination or bundle as indicated at FIG. 11 the reflecting faces 56 of sheet 52 form a two-dimensional array. Referring now to the right-hand portion of FIG. 10 of the drawings, suppose that it is desired to illuminate a rectangular array of points (such as micro-images on a lensfiche) by means of such a transparent sheet. Assume that there are m rows and n columns, so that there are $N = mn$ points.

Let the spacing between the rows be represented by b and the spacing between the columns by a. Then the angle alpha by which it is required to tilt or bias the incoming light with respect to the X axis is determined by the requirement that every reflecting face 56 be in the line of sight along an incoming light ray. Thus, there nust be no reflecting face within the shadow of another reflecting surface. It is assumed that the incoming light is fairly well collimated, i.e., nearly parallel. The width w of each reflector is governed by the shadowing requirement also. That is, it is desired to make w sufficiently large so that all of the incoming light of a perfectly collimated beam is reflected out of the sheet, but not so large that it would cast a shadow on any other reflecting surface 56. It will here be noted that the ensemble of reflectors 56 appears as a solid wall to one looking along an incoming light ray. All of these requirements are satisfied when $$\text{Alpha} = \arctan b/na \quad (1)$$

$$nw \sec(\text{alpha}) = b \quad (2)$$

As one specific example, $a = b = 0.2$ in. $n = 20$ and $m = 30$. Alpha $= 2° \; 52'$; $w = 0.01$ in.

In practice, it is desired that the "points" of light appear square when viewed along the perpendicular to the flat face of the sheet 52. Under this requirement, it follows that the sheet 52 should be of thickness w.

For the purpose of feeding light into the sheet, it becomes convenient to couple the source of light and the sheet by means of a light conductor. This may be done by tabs or strips 60 shown at FIGS. 10 and 11. The tabs are formed so that they enter the left edge of the sheet as shown at FIG. 10, their axes making an angle alpha with respect to the vertical.

If desired, the strips 60 may be cut such that the middle strips are the greatest width, with the top and bottom strips (viewed at FIG. 10) being of the narrowest width. This will result in an approximation to a circular cross-section when the ends of the strips are joined as shown at FIG. 11.

Figure 12:
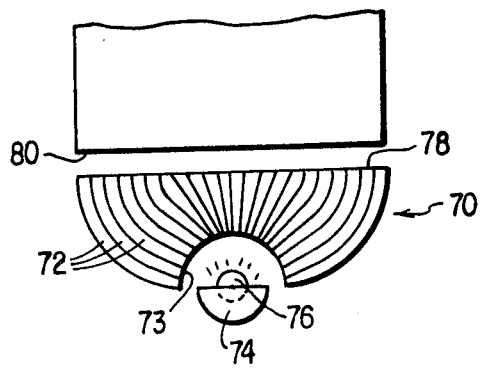
FIG. 12 is a partially schematic plan view of a device for illuminating the edge of a sheet or layer.
Figure 13:
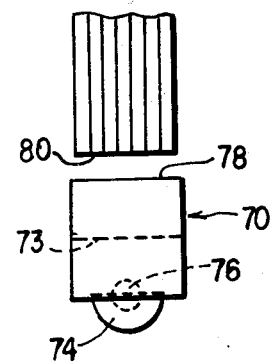
FIG. 13 is a view taken along section 12—12 of FIG. 12.

Referring now to FIGS. 12 and 13 of the drawings, a device suitable for the edge illumination of one or more transparent and totally-internally-reflecting sheets or layers described with respect to the preceding three embodiments is illustrated. The numeral 70 denotes generally an illuminating device defined by a plurality of curved optical fibers 72 of the type which are totally internally reflecting. Alternatively, in lieu of optical fibers 72, curved transparent sheets which are also totally internally reflecting may be employed. The fibers or the sheets, as the case may be, are curved so that their ends define a surface 73, with the surface 73 being normal to the ends of the fibers or sheets. The numeral 74 denotes a half-toroidal reflector having a parabolic cross-section. The focus of the parabola must lie on the axis of the toroid. A lamp or other source of illumination 76 is placed at one focus of the parabola. The other ends of the optic fibers or transparent sheets are planar and denoted by the numeral 78. The numeral 80 denotes an edge of one or more transparent sheets adapted to be illuminated. It will be understood that the edge 80 may be defined by one or more sheets, or, alternatively, by the overlap strips of the embodiment of FIG. 11.

It is believed that the operation of the illumination device 70 is apparent. Light from source 76 is transmitted to the input ends of the fiber bundles or curved transparent sheets at surface 73. Light then passes through these elements, by total internal reflection and exits normal to surface 78. From here, it enters into an edge 80 which is to be illuminated.

Figure 14:
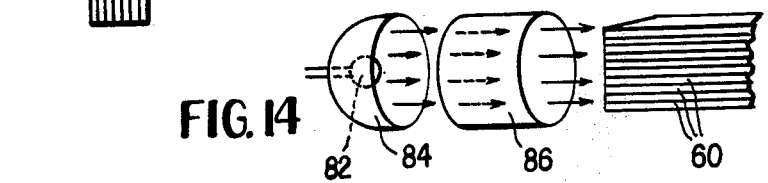
FIG. 14 illustrates a method for coupling a beam of light into a laminate of strips which, in turn, feeds light into the embodiment of FIG. 11.

In the case of the embodiment illustrated in FIG. 11, light may be fed into the end of the stack of strips by means of the lamp-and-reflector arrangement shown in FIG. 14. There, a lamp 82 positioned within a paraboloidal reflector 84 directs light into a reflector tube 86, the light exiting to the input ends of strips 60.

While not illustrated, it will be apparent to the reader, in view of FIGS. 12 and 13, that the fibers or sheets 72 need not be a compact mass, but may be distributed. Thus, a plurality of separate optical fibers or a plurality of separate optical fiber bundles may extend from a source of illumination such as 76 either adjacent to or touching an edge 80 which is to be illuminated.

I claim:

1. An illuminating device for establishing an array of closely-spaced individual sources of light, said device including,
   (a) a generally planar substrate having an array of individual apertures extending therethrough, said apertures being generally normal to the plane of the substrate,
   (b) a first coating on one surface of said substrate, said coating being of a transparent material having a first index of refraction, said first coating extending from said one surface into the surfaces of said individual apertures,
   (c) a second coating on top of and in contact with said first coating and being coextensive therewith, said second coating being transparent and having a second index of refraction greater than said first index of refraction,
   (d) the surface of said second coating having an annular depression opposite each aperture in said substrate, each depression being of a depth at least equal to the thickness of said second coating,
   (e) whereby light directed to the edges of said coatings will be transmitted by internal reflection to the apertures and will exist from the apertures in the direction substantially normal to the plane of the substrate.

2. The illuminating device of claim 1 wherein said substrate is opaque.

3. The illuminating device of claim 1 wherein the two transparent coatings fill the said apertures.

4. The illuminating device of claim 1 wherein the two transparent coatings do not completely fill said apertures, thereby defining an elongated and generally cylindrical void in each aperture centrally and longitudinally thereof.

5. The illuminating device of claim 1 wherein the entrances on said one surface to said apertures is chamfered.

6. An illuminating device for producing an array of point sources of light, including,
   (a) a transparent sheet,
   (b) a plurality of light-reflecting faces each oriented in the same direction and carried by and integral with said sheet, said reflecting faces positioned between the two surfaces of said sheet,
   (c) an edge of said sheet adapted to receive light in the direction of said faces,
   (d) said light reflecting faces being spaced apart from each other and each extending from one surface of said sheet to the other surface of said sheet, each reflecting face being defined by a void extending from one surface of said sheet towards its other surface, said void having a wall, the wall defining said reflecting face, each of said reflecting faces being planar and being at an angle of 45° with a surface of said sheet, said plurality of reflecting faces being defined by n vertical columns spaced a apart and m horizontal rows spaced b apart, one edge of said sheet receiving light parallel to the plane of the sheet, at an angle alpha with respect to the said rows, said faces each being of width w measured in a direction normal to the direction of the light, the relation between the quantities being that, alpha=arctan b/na, and, nw=b cos (alpha).

7. The illuminating device of claim 6 wherein said sheet is of thickness w and wherein each reflecting face is planar and intersects the plane of said transparent sheet at an angle of 45°.

8. The illuminating sheet of claim 6 wherein said transparent sheet is provided with a plurality of integral strips, the strips being aligned at a fixed angular relationship with respect to the rows of said array of reflecting faces, said strips being bent out of the plane of said sheet, and laminated together at their free ends to thereby define a light-input face.

9. An illuminating device for producing an array of point sources of light, including,
   (a) a transparent sheet,
   (b) a plurality of light-reflecting faces each oriented in the same direction and carried by and integral with said sheet, said reflecting faces positioned between the two surfaces of said sheet, said reflecting faces being distributed over the said sheet and forming a two-dimensional array,
   (c) an edge of said sheet adapted to receive light in the direction of said faces,
   (d) said light reflecting faces being spaced apart from each other and each extending from one surface of said sheet to the other surface of said sheet.

10. The combination of an illuminating device and a microfiche, the illuminating device producing an array of point sources of light for illuminating developed microimages on a microfiche, each point source of light being optically aligned with one of the developed microimages, the combination including,
    (a) a transparent sheet,
    (b) a plurality of light-reflecting faces each oriented in the same direction and carried by and integral with said sheet, said reflecting faces positioned between the two surfaces of said sheet, said reflecting faces being distributed over the said sheet and forming a two-dimensional array,
    (c) an edge of said sheet adapted to receive light in the direction of said faces,
    (d) said light reflecting faces being spaced apart from each other and each extending from one surface of said sheet to the other surface of said sheet,
    (e) a microfiche having a plurality of developed microimages, each said light reflecting face being optically aligned with a microimage of the microfiche, whereby light fed into an edge of the sheet in the direction of the reflecting faces is reflected by the reflecting faces out of the plane of the sheet and towards and through the microimages for subsequent viewing.

11. The illuminating device of claim 10 wherein said sheets are in juxtaposed, touching relationship at a region of each spaced from its light output edge.

12. The illuminating device of claim 11 wherein each said sheet is J-shaped in cross-section.

* * * * *